United States Patent
Madan et al.

(10) Patent No.: US 12,222,898 B1
(45) Date of Patent: Feb. 11, 2025

(54) AI PLATFORM FOR PROCESSING AND QUERYING SPECIFIED OBJECTS

(71) Applicant: UTECH PRODUCTS, INC., Schenectady, NY (US)

(72) Inventors: Rakesh K. Madan, Schenectady, NY (US); Zohair Hussain Jaffri, Schenectady, NY (US); Jeevithan Alagurajah, Schenectady, NY (US); Manish K Madan, Pittsord, NY (US)

(73) Assignee: UTECH PRODUCTS, INC., Schenectady, NY (US)

( * ) Notice: Subject to any disclaimer, the term of this patent is extended or adjusted under 35 U.S.C. 154(b) by 0 days.

(21) Appl. No.: 18/886,129

(22) Filed: Sep. 16, 2024

(51) Int. Cl.
*G06F 16/00* (2019.01)
*G06F 16/14* (2019.01)
*G06F 16/185* (2019.01)

(52) U.S. Cl.
CPC .......... *G06F 16/148* (2019.01); *G06F 16/144* (2019.01); *G06F 16/156* (2019.01); *G06F 16/185* (2019.01)

(58) Field of Classification Search
CPC .................................................... G06F 16/148
See application file for complete search history.

(56) References Cited

U.S. PATENT DOCUMENTS

2024/0345551 A1* 10/2024 Ramanasankaran ......... G05B 13/027

\* cited by examiner

*Primary Examiner* — Ajith Jacob
(74) *Attorney, Agent, or Firm* — Hoffman Warnick LLC

(57) ABSTRACT

An AI based system and method for processing and querying files. A method of processing files for an artificial intelligence (AI) querying service includes: hierarchically parsing the files into a set of hierarchically connected data chunks; generating metadata for each of the hierarchically connected data chunks, wherein the metadata includes hierarchical information; processing the hierarchically connected data chunks and metadata with an embedding model to generate vector embeddings that include the hierarchical information; generating textual summaries from the hierarchically connected data chunks; and storing the vector embeddings, textual summaries, and hierarchically connected data chunks for the AI querying service.

20 Claims, 9 Drawing Sheets

Figure 4

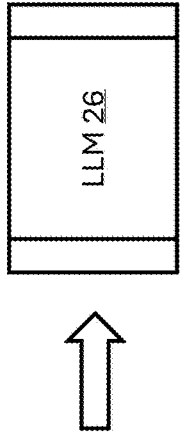

Prompt 90 <prompt text>

Query: What is the latest diagnosis for the Patient?

Summaries:
* one sentinel lymph node from the left axilla was negative for metastasis, while another sentinel lymph node from the same area showed a 0.5 mm micrometastasis of carcinoma without extracapsular extension.
* Procedure date – August 2003.

Data Chunks:
- Diagnostic Anatomique-Anatomical Diagnosis\n1. Lymph node, sentinel #1, left axilla, biopsy: One lymph node, negative for metastasis (0/1)\n\nFinal Pathology Report > Diagnostic Anatomique-Anatomical Diagnosis\n2. Lymph node, sentinel #2, left axilla, biopsy: Metastatic carcinoma involving lymph node (1/1) - metastatic focus is 0.5 mm in size (micrometastasis) - no extracapsular extension is identified
- Cold Snare
- Diverticulosis from the sigmoid to the mid descending colon.

AI PLATFORM FOR PROCESSING AND QUERYING SPECIFIED OBJECTS

TECHNICAL FIELD

The subject matter of this disclosure relates to an artificial intelligence (AI) platform for processing and querying a specified set of objects, and more particularly relates to an AI platform that utilizes hierarchical parsing, metadata processing and vectorization to process and query specified data objects.

BACKGROUND

With the advent of large language models (LLMs) and other AI based technologies, users are able to interact with large caches of data in a natural manner and obtain highly relevant responses to queries. For example, ChatGPT is trained on large amounts of data from the Internet, which allows users to obtain information on virtually any subject.

In some cases, however, users are required to interact with a relatively concise set of data objects, such as a set of files, and ascertain information relevant to the user. For example, a user might need to interact with a set of medical records, a set of audio-visual files, a set of engineering documents, a set of legal documents, etc.

SUMMARY

Aspects of the disclosure provide an artificial intelligence (AI) platform that processes a specified set of data objects and provides an AI querying service to perform queries associated with the specified set of data objects.

A first aspect provides a system, including: a memory; and a processor coupled to the memory and configured to process a specified set of files for an artificial intelligence (AI) querying service according to process that includes: hierarchically parsing the specified set of files into a set of hierarchically connected data chunks; generating metadata for each of the hierarchically connected data chunks, wherein the metadata includes hierarchical information; processing the hierarchically connected data chunks and metadata with an embedding model to generate vector embeddings that include the hierarchical information; generating textual summaries from the hierarchically connected data chunks; and storing the vector embeddings, textual summaries, and hierarchically connected data chunks for the AI querying service.

A second aspect provides a method of processing files for an artificial intelligence (AI) querying service, the method comprising: hierarchically parsing the files into a set of hierarchically connected data chunks; generating metadata for each of the hierarchically connected data chunks, wherein the metadata includes hierarchical information; processing the hierarchically connected data chunks and metadata with an embedding model to generate vector embeddings that include the hierarchical information; generating textual summaries from the hierarchically connected data chunks; and storing the vector embeddings, textual summaries, and hierarchically connected data chunks for the AI querying service.

A third aspect provides artificial intelligence platform, comprising: a memory; and a processor coupled to the memory and configured to process a specified set of data objects for an AI querying service according to process that includes: hierarchically parsing the specified set of objects into a set of hierarchically connected data chunks; generating metadata for each of the hierarchically connected data chunks, wherein the metadata includes hierarchical information; processing the hierarchically connected data chunks and metadata with an embedding model to generate vector embeddings that include the hierarchical information; and storing the vector embeddings and hierarchically connected data chunks for the AI querying service; wherein the AI querying service processes a query according to a process that includes: generating a query embedding from the query using the embedding model; retrieving a subset of hierarchically connected data chunks based on the query embedding; submitting the query and subset of hierarchically connected data chunks to a large language model (LLM); and receiving a response from the LLM.

In a further aspect, an AI querying service processes a query according to a method that includes: generating a query embedding from the query using the embedding model; retrieving a subset of hierarchically connected data chunks based on the query embedding, wherein the retrieving utilizes metadata filtering and nearest neighbor retrieval; selecting a subset of the textual summaries based on the query; submitting the query, subset of textual summaries, and subset of hierarchically connected data chunks to a large language model (LLM); and receiving a response from the LLM.

Additional aspects may include one or more of the following. Any of the above aspects including one or more of the following: wherein the textual summaries are generated using a large language model; further comprising an indexing system the links vector embeddings to the hierarchically connected data chunks; wherein the subset of textual summaries are selected based on relevance to the query; wherein the metadata filtering reduces a search space of hierarchically connected data chunks prior to implementing nearest neighbor retrieval; wherein the metadata filtering limits nearest neighbor retrieval to hierarchically connected data chunks at a common hierarchical level; wherein the query, subset of textual summaries, and subset of hierarchically connected data chunks are submitted to the LLM with a prompt; wherein the embedding model is trained using a loss function that uses a multiple negative ranking loss; and/or wherein the specified set of files belong to a domain selected from a group consisting of: medical, legal, engineering, finance, and entertainment.

BRIEF DESCRIPTION OF THE DRAWINGS

These and other features of this invention will be more readily understood from the following detailed description of the various aspects of the invention taken in conjunction with the accompanying drawings in which:

FIG. 4 shows a mongo database entry according to embodiments.

FIG. 5 shows an illustrative prompt for a large language model according to embodiments.

FIG. 7 depicts a client user interface for submitting queries according to embodiments.

Figure 1:
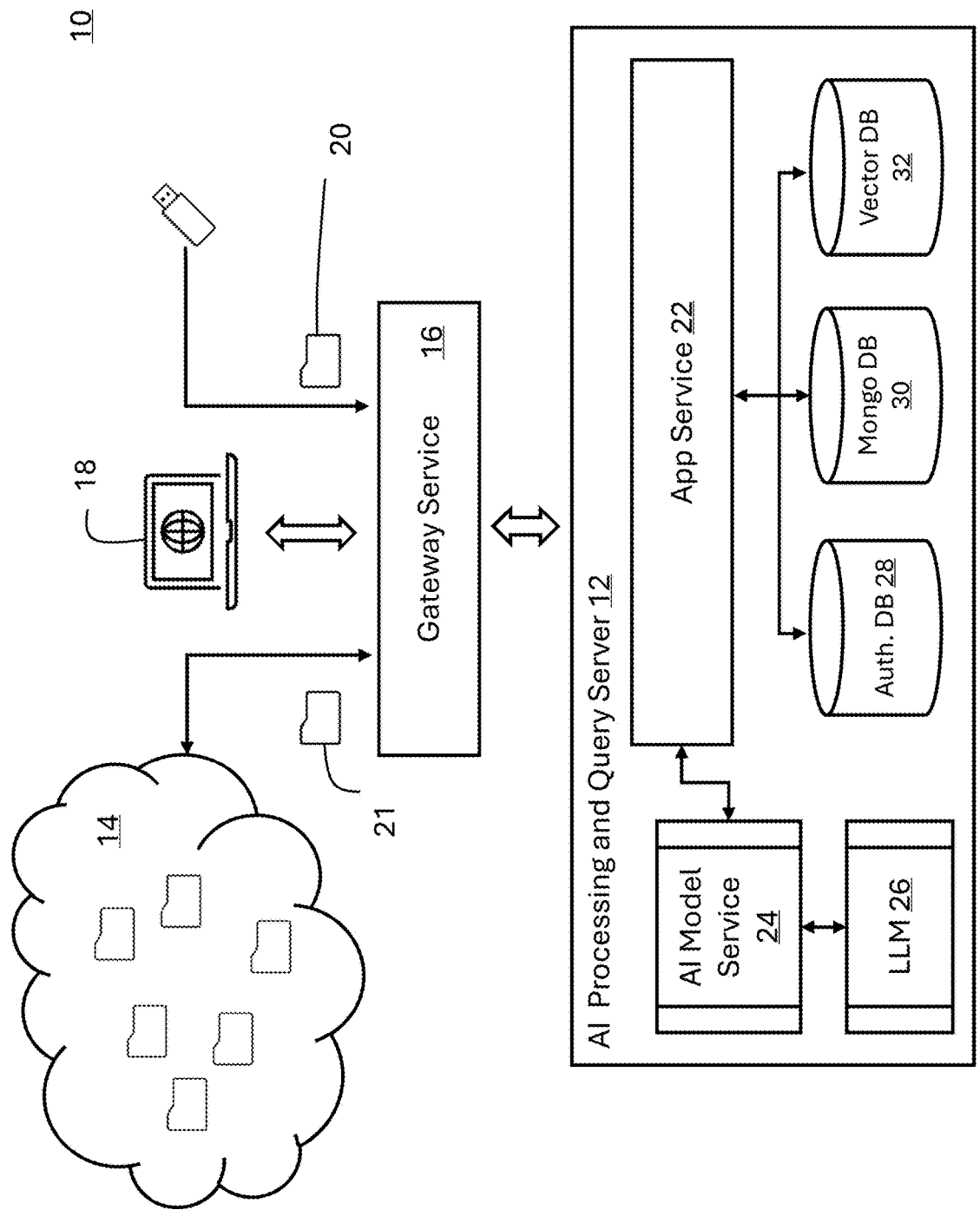
FIG. 1 shows an AI platform for processing and querying a set of specified objects according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Various embodiments provided herein relate to an artificial intelligence (AI) platform for processing and querying a specified set of objects. These embodiments address technical shortcomings in AI-based querying systems in which querying is directed at a relatively small data set. A technical solution is provided with an AI platform that utilizes a specially trained embedding model and a large language model (LLM) to enhance such querying operations. In certain aspects, the objects being queried may include a collection of data objects in the form of files such as documents, images, video, audio, or any combination thereof. Documents may for example include PDF documents, XML documents, spreadsheets, word processing documents, or any combination thereof. In various aspects, the collection of objects may be associated with a defined domain, such as a set of medical records for a patient, a set of legal documents associated with a case, a collection of engineering documents for a project, a collection of mixed media files associated with an entertainment production, etc.

FIG. 1 depicts an overview of an illustrative AI platform 10 that includes an AI processing and query server ("server") 12 that can be accessed by one or more clients 18 via a gateway service 16, e.g., using a web application or desktop application. Server 12 includes an App service 22 that (1) allows a client 18 to specify and/or upload a set of data objects to the server 12 for processing; and (2) provides an interface for querying information associated with the set of objects using a natural language (NL) interface. For example, a user of client 18 can specify a set (e.g., a folder) of files 21 from a cloud service 14 that stores multiple sets of files. Alternatively, the user of client 18 can upload a set of their own files 20, e.g., stored on a thumb drive, hard drive, local area network, etc. Processing of objects and performing queries of those resources is managed by the App service 22, which is supported by an AI model service 24 and large language model (LLM) 26. In an illustrative implementation, AI model service 24 includes an AI object processing service (described in further detail in FIG. 2) and an AI querying service (described in further detail in FIG. 3).

Server 12 also includes an authentication database 28 for authenticating users, an index database such as mongo database 30 for storing index identifiers, and a vector database 32 for storing vectorized data chunks obtained from the set of resources (20, 21). Mongo database 30 may for example comprise a document database built on a horizontal scale-out architecture that uses a flexible schema for storing data. Instead of storing data in tables of rows or columns like SQL databases, each record in the mongo database 30 is a document described in BSON, a binary representation of the data. App service can then retrieve this information in a JSON format. Fields in the document can be indexed to increase search performance, i.e., if an appropriate index exists for a query, the database can use the index to limit the number of documents it must inspect.

Vector database 32 operates with the mongo database 30 to index and store vector embeddings for fast retrieval and similarity search. Vector embeddings are a type of vector data representation that includes semantic information for an AI model to gain understanding and maintain a long-term memory that can be drawn upon when executing complex tasks. Embeddings are generated by an AI model (such as by AI model service 24) and have many attributes or features. In the context of AI and machine learning, these features represent different dimensions of the data that allow for the understanding of patterns, relationships, and underlying structures.

Figure 2:
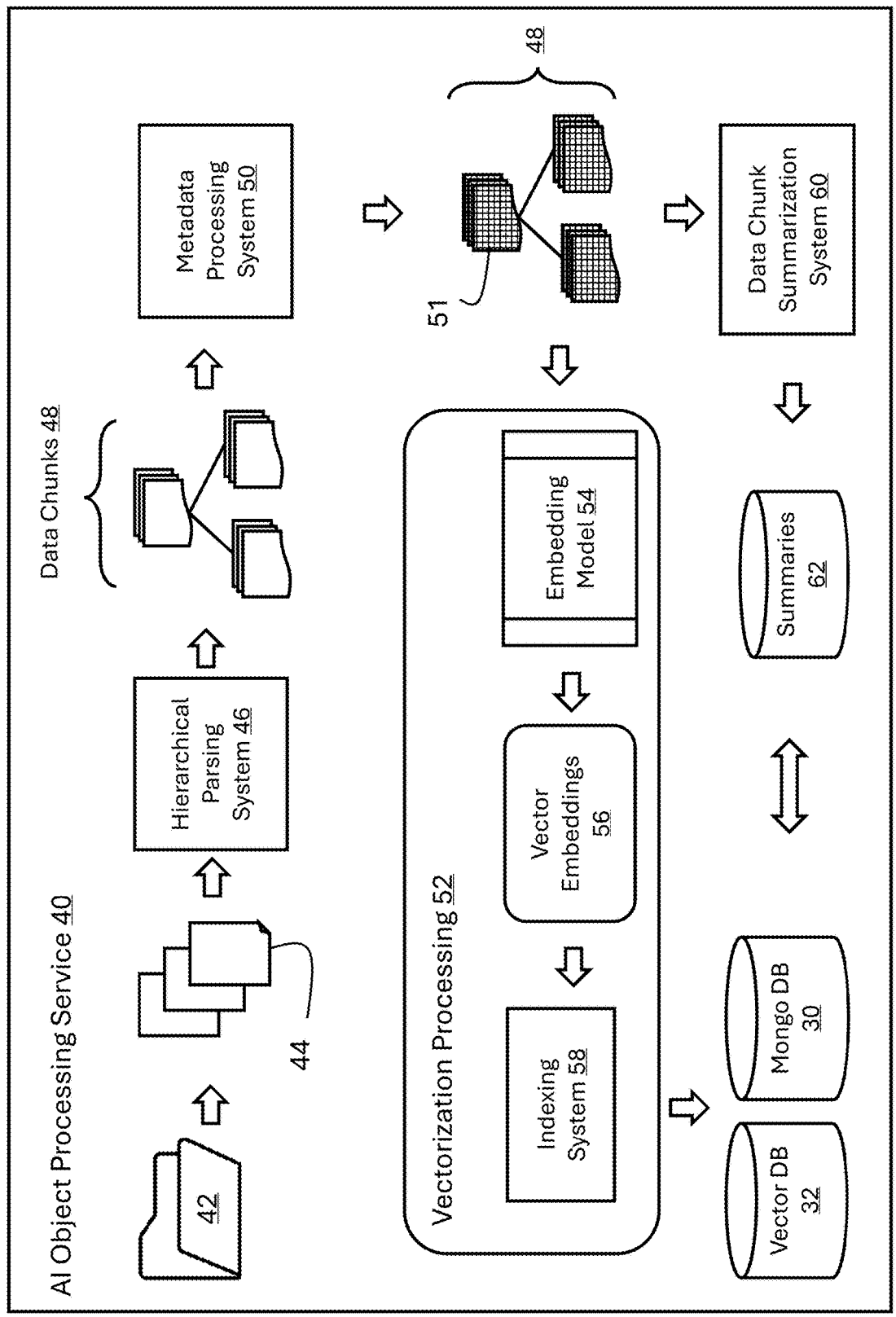
FIG. 2 shows a system for processing a set of specified objects according to embodiments.

FIG. 2 depicts an AI object processing service 40 configured to receive a set of data objects, such as files 44, e.g., from a specified folder 42. The set of files 44, as noted, may comprise any specified set of files that a user or system may have interest in querying using AI (e.g., a set of patient records, a group of engineering documents, financial documents, media files, etc.). Initially, a hierarchical parsing system 46 reads in the files 44 and generates a set of hierarchically connected data chunks 48. Hierarchical parsing system 46 creates data nodes arranged in a hierarchical order, which are ultimately maintained in vector database 32. For instance, in a set of medical records for a patient, a parent node may include general or broad information about a procedure, while a set of child nodes may have information about findings and diagnosis. Arranging data chunks 48 hierarchically ensures redundancy and improves the chances of retrieving relevant information for a given query.

Hierarchical parsing system 46 structures information in way that mirrors human cognition. Namely, by hierarchically connecting data chunks 48, parsing system 46 improves search accuracy, allowing queries to be directed to specific levels of the hierarchy, leading to quicker more precise results. This approach also enhances information retrieval in that redundancy at different levels increases the likelihood of finding relevant information, even with partial or ambiguous queries. Further, the approach facilitates knowledge discovery as the hierarchical structure reveals relationships and patterns that might be hidden in flat data.

In certain implementations, a data chunk 48 may comprise a collection of fields from a document stored as a data array mapped to one or more identifiers. For example, a portion of a medical record may form a data chunk that is mapped to a patient ID, a procedure ID and a facility ID. The data chunk may comprise array items that include fields such as a proposed procedure name, an index ID (that identifies the chunk), date fields, a document type, a procedure date, a tag or title, a description, summary text, specific data points about the patient (e.g., age, gender, medical history, lab results, etc.), and node relationships that indicate hierarchical relationships with other chunks.

For example, consider an example of a set of medical records for a colonoscopy procedure. The hierarchy of data chunks 48 may be as follows:

Parent Node: Colonoscopy
    Child Node 1: Findings
        Grandchild Node 1.1: Polyp size and location
        Grandchild Node 1.2: Inflammatory changes
        Grandchild Node 1.3: Other findings
    Child Node 2: Diagnosis
        Grandchild Node 2.1: Polyp histology
        Grandchild Node 2.2: Inflammatory bowel disease
        Grandchild Node 2.3: Other diagnoses This not only provides a structure for quickly responding to specific queries such as, "What is the size of the polyp found in the ascending colon?"; but also allows for a structure in which broader queries can be readily implemented, e.g., "What are the common findings in patients with inflammatory bowel disease?" Furthermore, because a higher level of contextual understanding is available between child node relationships such as findings and diagnosis, the system provides more informative responses.

Furthermore, in various implementations, hierarchical parsing system 46 is intended to handle parsing beyond text extractions. For example, in PDF documents, hierarchical parsing system 46 may be: (1) configured to identify and preserve the original structure of the PDF, including sections, subsections, tables, figures, and lists; (2) provide semantic understanding, e.g., capturing the meaning of different document elements (e.g., recognizing headings, footers, and captions); and (3) provide data extraction, extracting relevant data from tables, figures and text blocks. In other file types, such as image files, hierarchical information such as image type, values, colors, and recognition data may be parsed and captured.

Metadata processing system 50 operates in conjunction with hierarchical parsing system 46 to create metadata 51 for each data chunk 48, including, e.g., document creation date, tags, title, procedure names, etc. Metadata 51 also captures the hierarchical structure of the information, including parent-child relationships between different data elements. During querying operations, a search engine can use the metadata to exploit the hierarchical structure and refine search results accordingly. For example, a medical record stored in the vector database 32 may include the following metadata values for a give set of fields:

| Field | Metadata Value |
| --- | --- |
| Document Type | Medical Record |
| Patient ID | 12345 |
| Procedure | Colonoscopy |
| Node Type | Findings |
| Parent Node | Colonoscopy |

This metadata indicates that the information about "Findings" is part of a larger document categorized as a "Medical Record" for "Patient ID 12345" related to a "Colonoscopy" procedure.

Metadata may be generated in any manner by metadata processing system 50. For XML documents, metadata extraction is straightforward due to its structured nature. However, for PDFs and text documents, an AI-based tagging system may be used, which is a form of AI that analyzes the context of a resource and generates tags from a standard language. In the present case, such a system analyzes data chunks 48 and assigns appropriate tags and titles based on predefined labels. In one illustrative embodiment, the softmax function is used for tagging text into predefined labels:

$$\text{softmax}(LLM(T)_j) = \exp(LLM(T)_j)/\Sigma_{k=1 \text{ to } n} \exp(LLM(T)_k)$$

where $LLM(T)_j$ is the logit output for label $I_j$ from the language model (LLM). The label li with the highest probability is assigned to the text chunk T using the arg max function:

$$\text{Assigned Label} = \arg\max \text{softmax}(LLM(T)_j)$$

Once generated, each data chunk 48 along with its metadata 51 is vectorized by vectorization processing 52. Vectorization processing 52 uses an embedding model 54 to generate vector embeddings 56 from the data chunks 48 and associated metadata 51. Indexing system 58 indexes and stores the data chunks 48 and the corresponding embeddings 56. Each generated vector accordingly incorporates metadata that includes hierarchical information. The metadata specifies the vector's position in the hierarchy, e.g., parent, child, etc. Search queries can accordingly filter the vectors based on their hierarchical attributes.

A typical embedding for a text entry such as "5 mm sessile polyp" will generally comprise a vector such as [0.23, 0.45, −0.12, 0.78, . . . 0.1], having hundreds or thousands of numbers or attributes. Accordingly, each vector is of high dimensionality, which captures the semantic meaning of the text entry and the structure (i.e., syntax) of the data. Words with similar meanings will have vectors that are close together in the vector space.

Indexing system 58 creates a separate index structure to map vectors to their corresponding data chunks (and associated hierarchical positions), which is stored in Mongo database 30. This process involves creating a mapping between the unique identifier of a data chunk (e.g., chunk_id or Index_id) and the vector representing that chunk. Mongo database 30 can also store some additional information, such as: checksum values for files in current knowledgebase (i.e., if the checksum does not match the value in the new query, it can be recreated); version of the embedding model 54 with which the knowledge base was generated; a list of titles, a tag list, list of document names, a continuity of care (CCD) mode; a proposed procedure list; etc. FIG. 4 depicts an illustrative Mongo record showing some of these items.

The index structure can be a tree-like structure or a graph, depending on the complexity of the hierarchy. During a query process, a search query can efficiently traverse the index structure to find relevant vectors. For example, consider a medical record with a hierarchical structure:

Patient
    Medical History
        Conditions
        Procedures
    Lab Results Each of these entities (Patient, Medical History, Conditions, Procedures, Lab Results) are represented as a vector. Their hierarchical relationships are stored in metadata associated with each vector, or in a separate index. In essence, while vectors themselves can be stored independently, the hierarchical context may be maintained through associated metadata or external indexing.

Hierarchies significantly enhance retrieval by providing a structured framework for organizing and accessing information. Some of the benefits include improved precision and recall. Hierarchies allow for a more focused search and specific queries by targeting particular levels or nodes within the structure. This increases the likelihood of retrieving relevant information. The structured framework also reduces noise. By organizing data into categories and subcategories, irrelevant information can be filtered out more effectively, improving the precision of search results. Hierarchies also enable faster search times with increased navigational efficiencies by reducing the search space. Instead of scanning through a vast amount of unstructured data, queries can be directed to specific branches of the hierarchy. Additionally, search times are improved through optimized indexing, i.e., hierarchical indexing techniques can be employed to accelerate search performance.

The use of hierarchies also enhances the user experience by allowing for a more intuitive interface. Hierarchical structures often mirror human cognitive processes, making them easier for users to understand and navigate. Such structures also facilitate exploration, in which users can explore information in a structured manner, moving from general to specific topics or vice versa.

Hierarchies also allow for a better understanding of relationships by revealing connections. Hierarchical structures can uncover relationships between different pieces of information that might be hidden in flat data. Such structures also improve contextualization; by understanding the hierarchical context of information, users can gain a deeper understanding of its meaning. Furthermore, hierarchical arrangements allow for scalability. Hierarchies can help manage large datasets by breaking them down into smaller, more manageable chunks. Hierarchical data structures can also optimize storage and retrieval processes. Hierarchies accordingly provide a structured foundation for efficient and effective information retrieval by improving precision, recall, speed, user experience, and scalability.

In addition to creating metadata, data chunk summarization system 60 creates textual summaries 62 of each data chunk 48. Each textual summary 62 is indexed and linked to a node of a corresponding data chunk. Data chunks 48 and summaries 62 may be stored in vector database 32 using object-based structures (such as the provided by WEVIATE®) that allows for rich metadata and flexible querying. In addition, classes may be defined for summaries 62 and data chunks 48 with appropriate properties (e.g., Index_id, text, summary, metadata, etc.). Vectorization may accordingly be based on the data chunk and/or summary and stored as a vector object.

Each of the generated textual summaries 62 may for example comprise a sentence, a phrase, or the like, about an associated data chunk that provides a concise representation of a node's content, which can then be used to enhance querying. Various methods can be employed to generate summaries 62, including using an LLM. For example, the following text chunks, fed into an LLM might generate the resulting summaries:
Text Chunk 1:
Diagnostic Anatomique-Anatomical Diagnosis\n1. Lymph node, sentinel #1, left axilla, biopsy: One lymph node, negative for metastasis (0/1)\n\nFinal Pathology Report>Diagnostic Anatomique-Anatomical Diagnosis\n2. Lymph node, sentinel #2, left axilla, biopsy: Metastatic carcinoma involving lymph node (1/1)—metastatic focus is 0.5 mm in size (micrometastasis)—no extracapsular extension is identified
Summary:
One sentinel lymph node from the left axilla was negative for metastasis, while another sentinel lymph node from the same area showed a 0.5 mm micrometastasis of carcinoma without extracapsular extension.
Text Chunk 2:
Microscopic Description\n#3.\nReceived fresh labelled left breast, consists of a left segmental mastectomy (#1) without skin, with a metallic guide wire.\nThe specimen is oriented by 3 sutures: short superior, long lateral and short+long anterior (as per requisition).\nThe specimen weighs 48.0 g and measures 4.1 cm ML×9.0 cm IS x\n\n\
Summary:
The specimen is a 48.0 g left breast segmental mastectomy with a metallic guide wire, oriented by sutures, measuring 4.1 cm mediolaterally and 9.0 cm inferosuperiorly.

Figure 3:
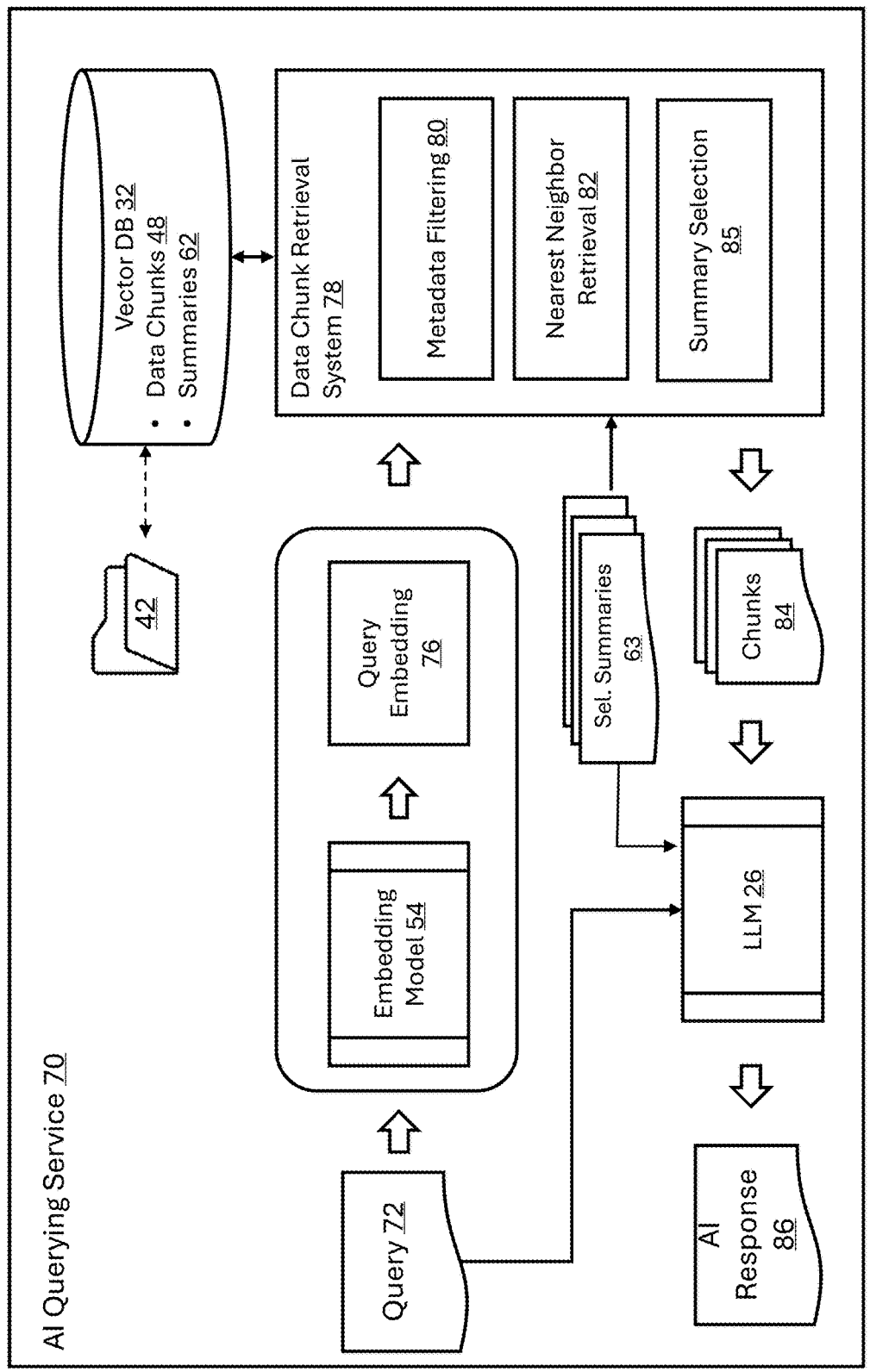
FIG. 3 shows a system for querying the set of specified objects according to embodiments.

Once the files 44 are fully processed by AI object processing service 40, a user can then submit queries associated with the files 44. FIG. 3 depicts an illustrative AI querying service 70, which is configured to receive a query 72 via a user input (text, voice, etc.) and output an AI response 86 for a specified set of data or folder 42. During querying, the query 72 is processed by the same embedding model 54 to create a query embedding 76. In certain implementations, the query may be initially preprocessed, e.g., cleaned, tokenized and converted into a numerical representation (e.g., using a technique such as word embeddings). The embedding model 54 processes the preprocessed query to generate a dense vector representation of the query, capturing its semantic and syntactic meaning. For example, the query, "what are latest diagnosis for Patient" might be tokenized ["what", "are", "latest", "diagnosis", "for", "Patient" ], and then fed into embedding model 54 trained on a domain relevant dataset to process these tokens and generates a high-dimensional vector, e.g., 1024 dimensions.

Data chunk retrieval system 78 retrieves relevant text chunks 84 from the vector database 32 based on their similarity to the query embedding 76. Retrieval is facilitated by metadata filtering 80 and nearest neighbor retrieval 82. Metadata filtering 80 uses tags, titles, hierarchical node types, dates, etc., to narrow down the data chunks available for retrieval. This is done by creating filters based on the metadata and applying them to the indexed data chunks. For example, if the query is directed at a particular hierarchical node type, date range, title, etc., the retrieval can be limited to those data chunks that match the criteria.

For example, consider the query "What are all the diagnoses for this patient?" Metadata filtering 80 may apply a metadata filter to efficiently retrieve only diagnosis-related data chunks 84. Assume metadata for each chunk includes: a Chunk ID or IndexID that provides a unique identifier for the chunk; a Patient ID that identifies a patient for the chunk; and a Chunk Type that categorizes the chunk (e.g., based on demographics, diagnosis, procedure, etc.). In this case, the Chunk Type "diagnosis" may be implemented as a filter to retrieve only chunks with the "diagnosis" Chunk Type and the specified patient ID. Thus consider the following chunks:

| Chunk ID | Patient ID | Chunk Type | Content |
| --- | --- | --- | --- |
| 12345_A | 12345 | demographics | Age: 35, Gender: Male |
| 12345_B | 12345 | diagnosis | Hypertension |
| 12345_C | 12345 | procedure | Colonoscopy |
| 12345_D | 12345 | diagnosis | Diabetes |

For the query "What are all the diagnoses for patient 12345?", the metadata filtering 80 would select chunks with Patient ID 12345 and Chunk Type "diagnosis". This would result in retrieving chunks B and D, which contain the diagnoses: Hypertension and Diabetes.

Nearest neighbor retrieval 82 is a technique that finds the closest data points to a query point in a high-dimensional vector space. In certain approaches, it is implemented as a type of proximity search that expresses closeness in terms of a dissimilarity function. The less similar the objects, the larger the function values. In one illustrative approach, given a query embedding q and a set of text chunk embeddings $E=\{e1, e2, \ldots, en\}$, the nearest neighbor retrieval is done by maximizing the cosine similarity:

$$\arg\max\ q \cdot ei/\|q\|\|e_i\| | e_i \in E$$

Data chunk retrieval system 78 accordingly retrieves a subset of data chunks 84 (e.g., 3-5 chunks) relevant to the query 72.

Summary selection 85 (FIG. 3) selects a subset of summaries, e.g., from vector database 32, which provides an intermediary between the data chunks 84 and the LLM 26. In one illustrative approach, summary selection 85 utilizes LLM 26 to process the user's query 72 to understand the query's intent and scope. Selected summaries 63 may be determined based on preliminary query 72 of LLM 26 through keyword matching, semantic similarity, or other techniques. For example, summaries 63 for a given query may be obtained and ranked by submitting a summary-based query to LLM 26, e.g., "Rank the following summaries from most to least relevant to the query: [query], [summary 1], [summary 2], . . . , [summary n]. Provide a confidence score for each ranking." This query explicitly asks the LLM 26 to order the summaries and provide a confidence level for its assessment.

Once determined, the selected summaries 63 provide additional context to query 72 and helps the LLM 26 refine its understanding of the user's intent. Selected summaries 63 also act as filters, allowing LLM 26 to focus on the most relevant information within the data chunks 84. Furthermore, LLM 26 uses summaries 63 as evidence to support its generated response 86. By grounding the response 86 in the summaries 63, LLM 26 improves the accuracy and relevance of the response 86. Summaries are used to rank different potential answers based on their alignment with the query 72 and the summary content. Summaries 63 act as a bridge between the user's query 72 and the underlying information, enhancing the LLM's ability to provide accurate, relevant, and informative responses. At the same time, LLM 26 presents information in a structured way, reflecting the hierarchical organization of the data chunks 84.

The core components typically fed into LLM 26 to generate AI response 86 are query 72, relevant summaries 63, and pertinent data chunks 84. An example of an input into LLM 26, along with a prompt 90 is shown in FIG. 5. Prompt 90 may for example include prompt text engineered to enhance the results, e.g., "Based on the provided summaries and data chunks, answer the query: [query]," "Provide a concise and informative response in bullet points or in a tabular format," or "Generate a response tailored to a patient with a high school education level."

In various embodiments, LLM 26 is designed for question-answering or summarization tasks. LLM 26 may be trained on a specific dataset of summaries to improve its performance on a particular task or domain (e.g., medical, legal, engineering, etc.). LLM 26 may be implemented to possess a broad understanding of language, syntax, semantics, and factual knowledge, and can adapt to different text formats, including summaries, and generate coherent and informative responses based on the provided content. Effective prompt engineering guides the LLM in producing the desired output.

The embedding model 54 is trained with data for a particular domain to ensure consistency in context and query embeddings. In one illustrative approach, embedding model 54 is trained using a loss function that uses a multiple negative ranking loss. Such a process involves:

Positive and Negative Pairs: Input batches consist of pairs (ai, pi) where ai is an anchor and pi is a positive example. Other positive examples in the batch act as negative examples.

Negative Sampling: For each anchor ai, all other positive examples pj (where j≠i) are negative samples.

Similarity Function: Cosine similarity between sentence embeddings is calculated and scaled by a factor:

$$S(a_i,p_j)=a_i \cdot p_j / \|a_i\| \|p_j\|$$

Softmax-Normalized Scores: The scores are normalized using the softmax function:

$$\sigma(a_i,p_j)=\exp S(a_i,p_j) \Sigma_k \exp(S(a_i,p_k))$$

Cross-Entropy Loss: The loss minimizes the negative log-likelihood:

$$L=-\Sigma_i \log(\sigma(a_i,p_i))$$

By training the embedding model 54 in this way on relevant domain data, the model 54 learns the specific nuances and vocabulary of the domain, leading to more accurate and relevant embeddings. The model 54 also becomes better at capturing similar meanings across different text chunks, ensuring consistency between the context (text) and query (search) embeddings. The result is that tasks like semantic searching can retrieve text based on meaning rather than just exact keywork matches.

For example, for an embedding model 54 involving medical records, the model may be trained on patient records that include structured data such as patient demographics (age, gender, race, ethnicity), medical history (diagnoses, procedures, medications), lab results, vital signs, etc., and unstructured data such as clinical notes, discharge summaries, radiology reports, pathology reports, etc. The expected output from the model may include patient embeddings, i.e., numerical representations of patients, capturing similarities based on medical history, diagnoses, treatments, and other relevant factors. The training objective in this case is a model that should learn to represent patients in a way that captures their overall health profile. The training process may for example include:

1. Data Preprocessing:
   Clean and normalize structured data.
   Tokenize and preprocess unstructured text data.
   Handle missing values and outliers.
2. Feature Engineering:
   Create numerical representations for categorical variables (e.g., encoding, embedding).
   Normalize numerical features.
3. Data Integration:
   Combine structured and unstructured data into a unified representation.
4. Model Training: Train the model on the combined dataset to learn patient representations.

Figure 6:
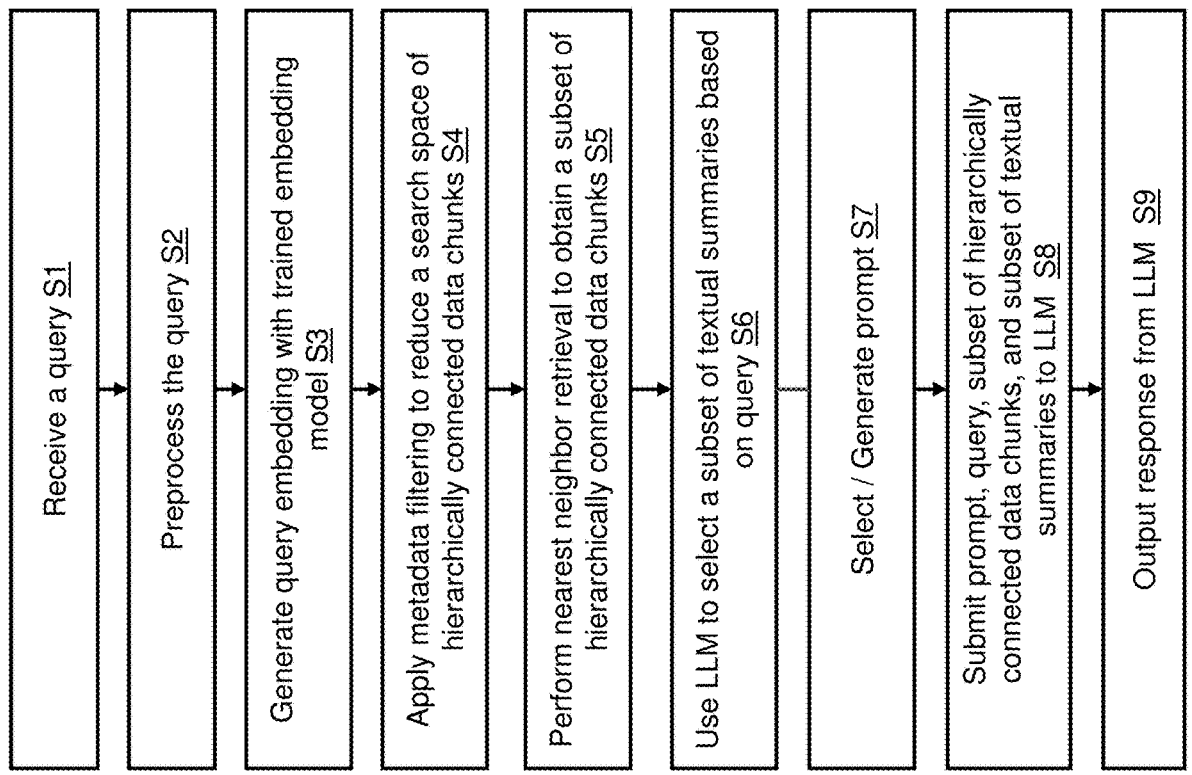
FIG. 6 depicts a flow diagram of an AI querying service according to embodiments.

FIG. 6 depicts a flow chart of an illustrative process involving AI querying service 70 (with reference to FIG. 3). Initially, at S1, a query 72 is received and at S2 the query is preprocessed, e.g., cleaned, tokenized and converted into a numerical representation, using a technique such as word embeddings). Word embeddings are a way of representing words as vectors in a multi-dimensional space, where the distance and direction between vectors reflect the similarity and relationships among the corresponding words. Next, at S3, a query embedding 76 is generated with a trained embedding model 54. At S4, metadata filtering is applied to reduce a search space of hierarchically connected data chunks 48 (e.g., generated using AI object processing service 40 shown in FIG. 2) based on the query embedding. For example, metadata filtering may limit the search space to hierarchically connected data chunks at a common hierarchical level (i.e., having the same or similar names or tags) of the query embedding or to nearby levels. At S5, nearest neighbor retrieval is performed to identify a subset of hierarchically connected data chunks with the search space most similar to the query embedding. At S6, a subset of textual summaries are selected (from a previously generated set of textual summaries) using LLM 26, e.g., rank summaries associated with the subset of hierarchically connected data chunks from most to least relevant to the query, and output the top 3 results. At S7, a prompt is selected or generated, e.g., from a set of previously engineered prompts or from the LLM 26, and at S8, the prompt, query, subset of hierarchically connected data chunks, and subset of textual summaries are submitted to the LLM. A response from the LLM 26 is then outputted, e.g., back to a client device.

Figure 7:
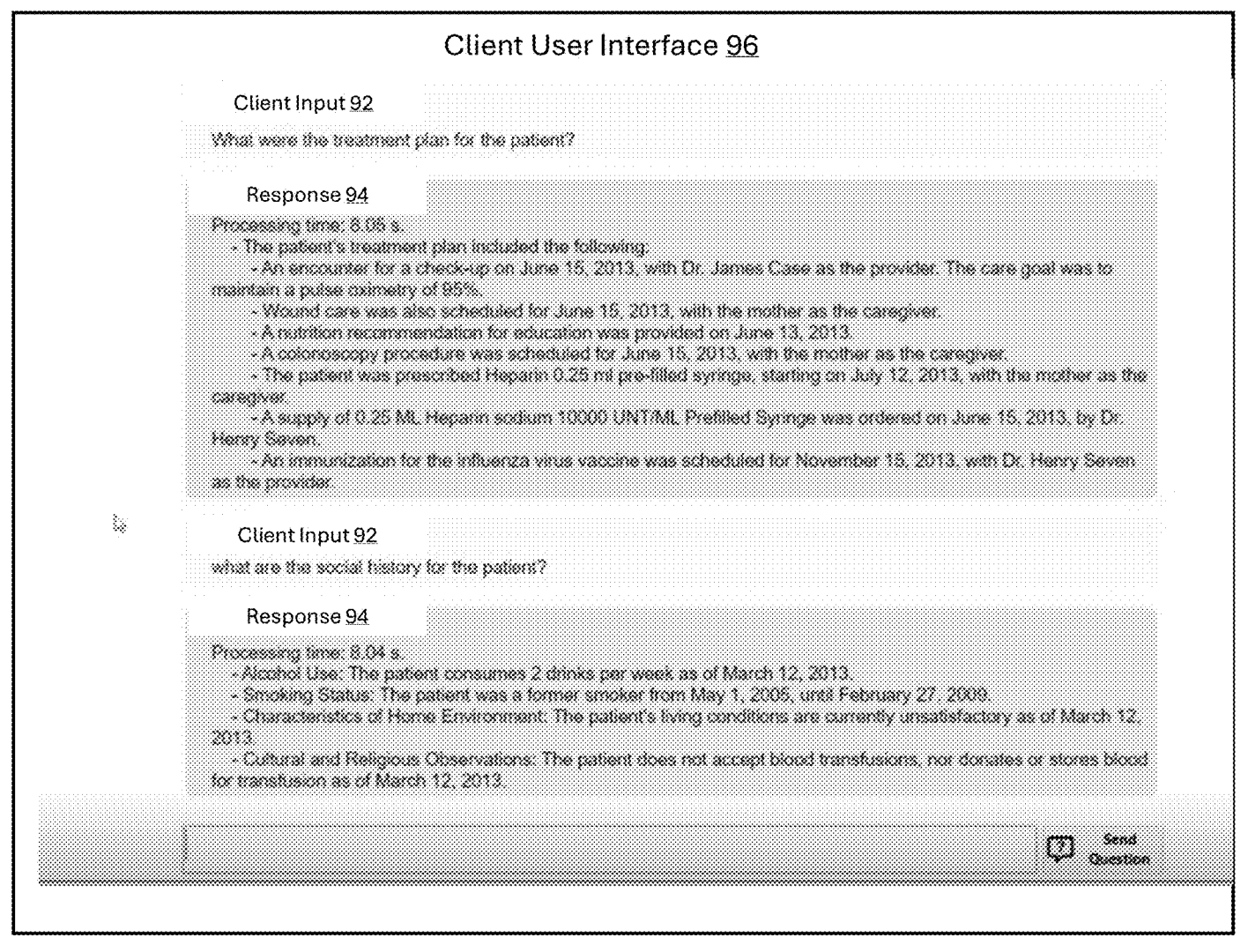

FIG. 7 depicts an illustrative client user interface 96 that shows client inputs 92 and responses 94 from the AI querying service 70.

Figure 8:
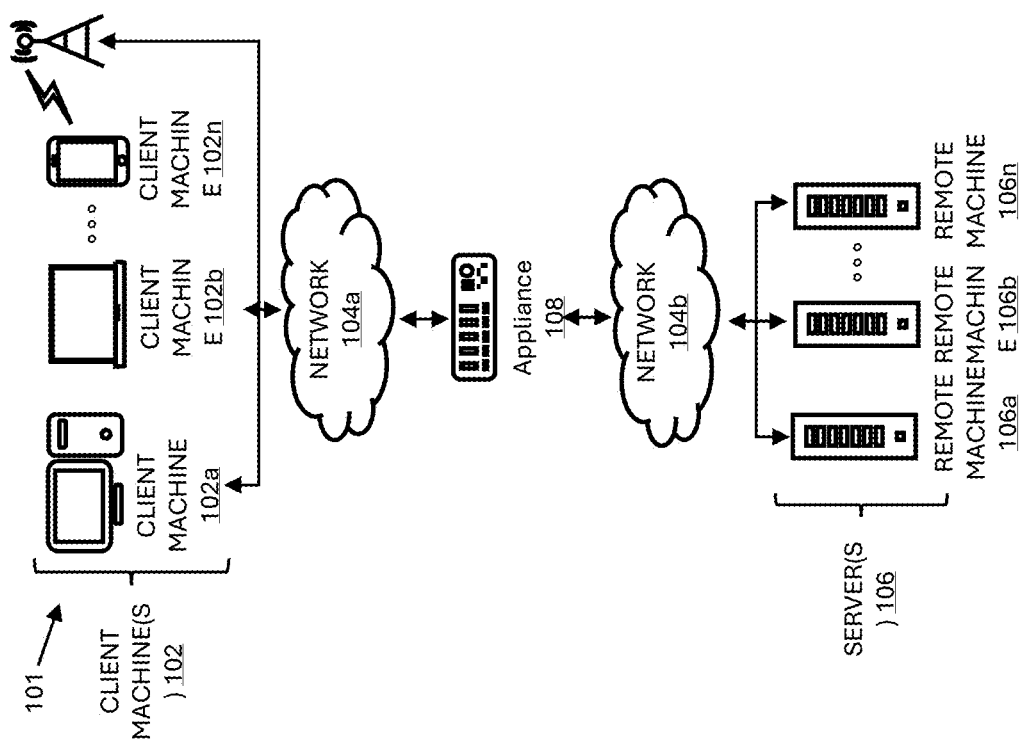
FIG. 8 depicts a network, according to embodiments.

It is understood that aspects of the described infrastructure can be implemented in any manner, e.g., as a stand-alone system, a distributed system, within a network environment, etc. Referring to FIG. 8, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 9:
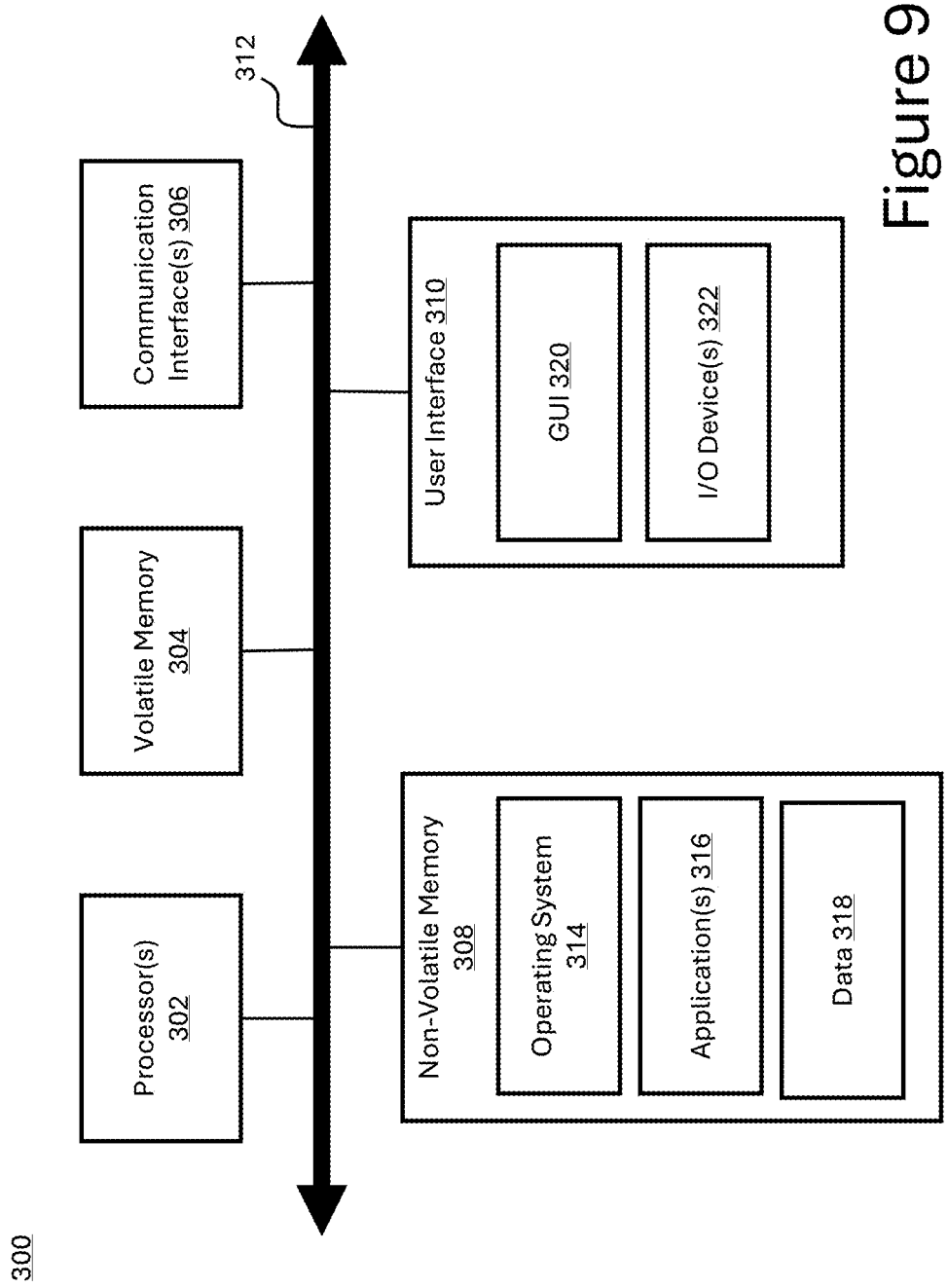
FIG. 9 depicts a computer system, according to embodiments.

Elements of the described solution may be embodied in a computing system, such as that shown in FIG. 9 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

What is claimed is:

1. A system, comprising:
a memory; and
a processor coupled to the memory and configured to process a specified set of files for an artificial intelligence (AI) querying service according to process that includes:
hierarchically parsing the specified set of files into a set of hierarchically connected data chunks;
generating metadata for each of the hierarchically connected data chunks, wherein the metadata includes hierarchical information;
processing the hierarchically connected data chunks and metadata with an embedding model to generate vector embeddings that include the hierarchical information;
generating textual summaries from the hierarchically connected data chunks; and
storing the vector embeddings, textual summaries, and hierarchically connected data chunks for the AI querying service.

2. The system of claim 1, wherein the AI querying service processes a query according to a process that includes:
generating a query embedding from the query using the embedding model;
retrieving a subset of hierarchically connected data chunks based on the query embedding, wherein the retrieving utilizes metadata filtering and nearest neighbor retrieval;
selecting a subset of the textual summaries based on the query;
submitting the query, subset of textual summaries, and subset of hierarchically connected data chunks to a large language model (LLM); and
receiving a response from the LLM.

3. The system of claim 1, wherein the textual summaries are generated using a large language model.

4. The system of claim 1, further comprising an indexing system that links vector embeddings to the hierarchically connected data chunks.

5. The system of claim 2, wherein the subset of textual summaries are selected based on relevance to the query.

6. The system of claim 2, wherein the metadata filtering reduces a search space of hierarchically connected data chunks prior to implementing nearest neighbor retrieval.

7. The system of claim 6, wherein the metadata filtering limits nearest neighbor retrieval to hierarchically connected data chunks at a common hierarchical level.

8. The system of claim 2, wherein the query, subset of textual summaries, and subset of hierarchically connected data chunks are submitted to the LLM with a prompt.

9. The system of claim 1, wherein the embedding model is trained using a loss function that uses a multiple negative ranking loss.

10. The system of claim 1, wherein the specified set of files belong to a domain selected from a group consisting of: medical, legal, engineering, finance, and entertainment.

11. A method of processing files for an artificial intelligence (AI) querying service, the method comprising:
hierarchically parsing the files into a set of hierarchically connected data chunks;
generating metadata for each of the hierarchically connected data chunks, wherein the metadata includes hierarchical information;
processing the hierarchically connected data chunks and metadata with an embedding model to generate vector embeddings that include the hierarchical information;
generating textual summaries from the hierarchically connected data chunks; and
storing the vector embeddings, textual summaries, and hierarchically connected data chunks for the AI querying service.

12. The method of claim 11, wherein the AI querying service processes a query according to a process that includes:
generating a query embedding from the query using the embedding model;
retrieving a subset of hierarchically connected data chunks based on the query embedding, wherein the retrieving utilizes metadata filtering and nearest neighbor retrieval;
selecting a subset of the textual summaries based on the query;

submitting the query, subset of textual summaries, and subset of hierarchically connected data chunks to a large language model (LLM); and receiving and outputting a response from the LLM.

13. The method of claim 11, wherein the textual summaries are generated using a large language model.

14. The method of claim 11, further comprising generating indexes that link vector embeddings to the hierarchically connected data chunks.

15. The method of claim 12, wherein the subset of textual summaries are selected based on relevance to the query.

16. The method of claim 12, wherein the metadata filtering reduces a search space of hierarchically connected data chunks prior to implementing nearest neighbor retrieval.

17. The method of claim 16, wherein the metadata filtering limits nearest neighbor retrieval to hierarchically connected data chunks at a common hierarchical level.

18. The method of claim 12, wherein the query, subset of textual summaries, and subset of hierarchically connected data chunks are submitted to the LLM with a prompt.

19. The method of claim 11, wherein the embedding model is trained using a loss function that uses a multiple negative ranking loss.

20. An artificial intelligence platform, comprising:
a memory; and
a processor coupled to the memory and configured to process a specified set of data objects for an AI querying service according to process that includes:
  hierarchically parsing the specified set of objects into a set of hierarchically connected data chunks;
  generating metadata for each of the hierarchically connected data chunks, wherein the metadata includes hierarchical information;
  processing the hierarchically connected data chunks and metadata with an embedding model to generate vector embeddings that include the hierarchical information; and
  storing the vector embeddings and hierarchically connected data chunks for the AI querying service;
wherein the AI querying service processes a query according to a process that includes:
  generating a query embedding from the query using the embedding model;
  retrieving a subset of hierarchically connected data chunks based on the query embedding;
  submitting the query and subset of hierarchically connected data chunks to a large language model (LLM); and
  receiving a response from the LLM.

* * * * *